United States Patent [19]
Kubicek

[11] 3,888,940
[45] June 10, 1975

[54] STEAM-ACTIVATED OLEFIN DISPROPORTIONATION CATALYSTS

[75] Inventor: Donald H. Kubicek, Bartlesville, Okla.

[73] Assignee: Phillips Petroleum Company, Bartlesville, Okla.

[22] Filed: Apr. 26, 1973

[21] Appl. No.: 354,550

[52] U.S. Cl. ...... 260/683 D; 260/666 A; 260/680 R; 260/677 R
[51] Int. Cl. .............................................. C07c 3/62
[58] Field of Search ........ 260/666 A, 677 R, 683 D, 260/680 R; 252/465, 458, 463

[56] References Cited
UNITED STATES PATENTS

| | | | |
|---|---|---|---|
| 2,463,072 | 3/1949 | Webb et al. | 252/465 |
| 2,897,161 | 7/1959 | Erickson | 252/465 |
| 2,914,486 | 11/1959 | Schwartz | 252/465 |
| 3,152,091 | 10/1964 | Gring | 252/465 |
| 3,261,879 | 7/1966 | Banks | 260/683 |
| 3,365,513 | 1/1968 | Heckelsberg | 260/683 |
| 3,463,828 | 8/1969 | Crain | 260/666 |
| 3,641,189 | 2/1972 | Turner et al. | 260/683 |
| 3,752,773 | 8/1973 | Duke et al. | 252/458 |

*Primary Examiner*—Delbert E. Gantz
*Assistant Examiner*—C. E. Spresser

[57] ABSTRACT

Molybdenum or rhenium containing olefin disproportionation catalysts exhibit marked increase in olefin disproportionation activity when thermally activated by heating in the presence of water or water vapor.

11 Claims, No Drawings

STEAM-ACTIVATED OLEFIN DISPROPORTIONATION CATALYSTS

FIELD OF THE INVENTION

The invention relates to a method to increase the olefin disproportionation activity of molybdenum or rhenium containing catalysts. In another aspect, the invention relates to olefin disproportionation processes using molybdenum or rhenium containing catalysts.

BACKGROUND OF THE INVENTION

Molybdenum or rhenium oxides supported on silica, alumina, or silica-or alumina-containing supports have been employed as catalyst compositions for olefin disproportionation reactions. Methods of increasing the activity of such catalysts are much to be desired in order to provide maximum commercial benefits.

OBJECTS OF THE INVENTION

It is an object of the invention to improve the olefin disproportionation activity of molybdenum and rhenium containing catalysts.

Other aspects, objects, and the several advantages of this invention will be apparent to one skilled in the art to which the invention most nearly pertains from the following description and from the appended claims.

SUMMARY OF THE INVENTION

I have discovered that molybdenum and rhenium containing catalysts exhibit marked improvement in olefin disproportionation activity when thermally activated in the presence of water or water vapor. The molybdenum catalysts further can contain a cobalt component. Presently preferred catalysts are commercially available supported cobalt molybdate disproportionation catalysts.

DETAILED DESCRIPTION OF THE INVENTION

CATALYSTS

The catalyst compositions employed in the process of my invention are supported molybdenum or rhenium catalysts. Suitable supports include silica, alumina, mixtures of silica and alumina, and silica- and alumina-containing compositions further containing minor amounts of other materials which are compatible with the olefin reaction as hereinafter defined, such as small amounts of titania, magnesia, and the like.

The amount of molybdenum or rhenium in my catalyst compositions can range widely and is not critical. Presently preferred for disproportionation purposes are catalyst compositions in which the molybdenum or rhenium is in the range of about 0.5 to 30 per cent by weight, calculated as the most stable oxide, of the total catalyst composition, more preferably about 1 to 15 weight per cent.

A cobalt component can be present, if desired, in the molybdenum promoted catalyst, in the range of up to about 20 weight per cent expressed as CoO, relative to the weight of the total catalyst, preferably about 1 to 5 weight per cent. Any cobalt compound can be employed which is the oxide or compound convertible thereto on calcination.

The molybdenum or rhenium can be added to the support as a molybdenum or rhenium compound; for example molybdenum hexacarbonyl, rhenium pentacarbonyl dimer, molybdenum oxide, rhenium oxide, or other molybdenum or rhenium materials convertible to the oxide thereof on calcination, employing a molecular oxygen-containing atmosphere where desired, can be used. Addition of the molybdenum or rhenium containing compound to the support, as well as the cobalt component where employed, can be carried out by such methods as dry mixing, coprecipitation, impregnation, or the like. It is sometimes advantageous to incorporate by similar methods small amounts of alkali metal compounds or alkaline earth metal compounds into the catalyst composition at any time prior to the final calcining step, preferably as the oxides, hydroxides, or compounds convertible to the oxide on calcination.

ACTIVATION

According to my invention the catalyst compositions as described are thermally activated in the presence of water or water vapor, preferably steam. The catalyst compositions can be activated according to my invention in an uncalcined form, partially calcined state, or in a completely calcined form. Any method of treating the compositions with water or water vapor can be employed. For example, the activation step according to my invention can be conducted in a static closed system in which a mixture of catalyst and water is heated in a closed vessel under such conditions that steam is generated in the presence of the catalyst and steam activation is thereby accomplished. A flow system also can be employed in which steam from an outside source is passed through a heated catalyst bed for the desired time to effect steam activation of the catalyst. The steam activation can be conducted in the presence of molecular oxygen, if desired.

The pressure employed does not appear critical in my thermal activation step, and can vary from about atmospheric pressure 0 psig up to about 1000 psig or more. Pressures near 200 psig are often satisfactory and convenient. Lower pressures may be employed with the flow system described, while higher pressures presently are preferred with the closed system.

The temperatures employed in my thermal activation step can vary widely, and exemplary temperatures include such as about 700° to 1,300° F. or more, preferably about 900° to 1,100° F.

The time employed for the thermal activation of the catalysts depends on the temperatures and pressures employed, since it is believed that excessive steaming of the catalyst may eventually tend to reduce or destroy its activity. The time employed broadly can be from a few minutes to several hours, such as about 5 minutes up to 6 hours or more, and presently preferably about 30 minutes to 1 hour as being sufficient. The shorter treatment times are preferred when the higher temperatures and pressures are employed. In any event, any loss of catalyst activity due to excessive steaming will be readily apparent when the catalyst is placed in service and can be adjusted on subsequent activation steps.

Following my thermal activation treatment and venting of the steam from the catalyst-water contact zone, the so-treated catalysts finally are subjected to a calcining step, i.e., heating in air or other molecular oxygen-containing atmosphere. The catalysts are subjected to calcination temperatures, such as about 700° to 1600° F., preferably 900° to 1400° F., for a sufficient time, such as about 0.5 to 20 hours or longer. The longer calcination intervals are used with lower temperatures, and shorter intervals with higher temperatures. At temperatures of about 1100° F. and lower, longer activation times, e.g., 50 hours or more, are not harmful to activity. It is preferred that the catalyst treatment be carried out in an atmosphere of flowing, non-reducing gas. Activation in the presence of an atmosphere of a free oxygen containing gas, e.g., air, is preferred, though less active but effective catalysts for disproportionation can be obtained by activation with an inert gas, providing that at least a part of the activated species, at the completion of the treatment, is in the oxide form. If the catalyst is not to be immediately placed in service, it may be cooled and stored under an atmosphere of an inert gas such as nitrogen. Contact of my thermally activated catalysts with air or moisture during storage and handling should be avoided.

Regeneration of my steam-activated catalysts, when desired after use in olefin disproportionation, can be readily accomplished. For example, a spent catalyst prepared from molybdenum oxide and alumina and steam activated, can be reheated in molecular oxygen-containing stream of gas for a sufficient time to restore its activity. It has been observed that the level of activity to which the steam-activated catalyst is restored upon regeneration is nearer that shown by the original steam-activated catalyst than that shown by the catalyst without steam activation. This observation indicates that the steam activation step of this invention provides a permanent improvement in the catalyst rather than a temporary change which would be lost upon regeneration. This means, of course, that the steam activation step need be carried out only once during the normal lifetime of the catalyst rather than initially and again after each regeneration. It also means that the described types of catalysts which have been in service without steam-activation can be removed from service, steam-activated according to my invention, calcined, and returned to service with resulting increased activity.

OLEFIN DISPROPORTIONATION

Catalysts prepared and activated according to my invention are suitable for the conversion of olefins according to the reaction which has become known as the "olefin reaction".

The olefin reaction is defined as a process for the catalytic conversion over a catalyst of a feed comprising one or more ethylenically unsaturated compounds to produce a resulting product which contains at least about ten weight percent of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than about twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

1. The disproportionation of an acyclic mono- or polyene having at least three carbon atoms into other acyclic mono- or polyenes of both higher and lower number of carbon atoms; for example, the disproportionation of propylene to yield ethylene and butenes, and the disproportionation of 1,5-hexadiene to yield ethylene and 1,5,9-decatriene;

2. The conversion of an acyclic mono- or polyene having three or more carbon atoms and a different acyclic mono- or polyene having three or more carbon atoms to produce different acyclic olefins; for example, the conversion of propylene and isobutylene to yield ethylene and isopentene;

3. The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 to yield 3-methylbutene-1 and propylene;

4. The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene to yield 2,8-decadiene, or the conversion of 1,5-cyclohexadiene and ethylene to yield 1,5,9-decatriene;

5. The conversion of one or more cyclic mono- or cyclic polyenes to produce a cyclic polyene having a higher number of carbon atoms than any of the starting materials; for example, the conversion of cyclopentene to yield 1,6-cyclodecadiene;

6. The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene to yield cyclohexene and ethylene; or 7. The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene to yield 1,4-cyclohexadiene and ethylene.

Olefins applicable for use in the process of my invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3 to 30 carbon atoms per molecule and with such cyclic olefins having 4 to 30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9-octadecapentene, 1,3-eicosadiene, 4-octene, 3-eicosene and 3-heptene, and the like, and mixtures thereof.

Examples of cyclic olefins suitable for the reactions of this invention include cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

REACTION CONDITIONS

The operating temperatures for the olefin reaction process utilizing my activated catalysts can be over a wide range, including −60° F. to 1100° F., depending on catalyst composition including support. Among the presently suggested ranges for specific combination are the use of molybdenum oxide/silica in the range of about 400° F. to 1100° F., preferred 600° F. to 1100° F., more preferred 800° F. to 1000° F.; molybdenum oxide/alumina in the range of about 150° F. to 550° F., preferred about 200° F. to 400° F.; and where cobalt oxide is employed with molybdenum oxide, the same ranges are employed. For the rhenium oxide group, suggested ranges for rhenium oxide/silica include about 300° F. to 1100° F., preferred 650° F. to 800° F.; rhenium oxide/alumina about −60° F. to 1000° F., preferred about 0° F. to 500° F., more preferred about 0° F. to 200° F., since with this type, the higher temperatures tend to exhibit some decrease in catalyst efficiency toward the olefin reaction because of competing side reactions, despite the general increases in catalyst activity at increasing temperatures. Any of the catalyst composition further including an alkali metal containing component such as potassium, lithium, calcium, magnesium, or the like, employ the same general temperature ranges as described above.

Generally, selecting an operating temperature in the higher portions of the selected temperature ranges tends to result in the catalyst bed being less susceptible to poisoning and tends to promote more rapid recovery from a temporary reduction in activity. In many instances, an operating temperature at or near regeneration temperature can be selected, thus reducing or eliminating costly or time-consuming cooling and heating cycles. For higher molecular weight olefins, the preferred temperatures will be somewhat lower.

The olefin reaction itself is essentially independent of pressure, except as pressure affects the density of the feed and thus the contact time. Furthermore, an increase in operating pressure usually results in lower operating temperature at constant conversion level. Pressures over a wide range are suitable, such as in the range of 0 to 2000 preferred 0 to 1500, more preferred 25 to 500 psig. However, particularly with higher olefins, especially olefins having at least 5 carbon atoms per molecule, operating at pressures in the lower portion of the range, e.g., below about 100 psig, reduces the tendency to form products more highly branched than the starting material.

The operable range of contact time for the olefin reaction process depends primarily upon the operating temperatures and the activity of the catalyst. In general, undesired reactions tend to be favored by longer contact times; therefore, the contact time should be maintained as short as possible, consistent with desired olefin conversion. In general, contact times in the range of about 0.1 to 60 seconds can be used and contact times in the range of about 1 to 60 seconds are suitable in many instances.

With a fixed bed reactor and continuous flow operation, weight hourly space velocities in the range of about 0.1 to 1000, preferably about 0.5 to 1000, WHSV parts by weight of hydrocarbon feed per part by weight of catalyst per hour are suitable, with excellent results having been obtained in the range of about 1 to 200.

The olefin reaction can be carried out either in the presence or absence of a diluent. Paraffinic and cycloparaffinic hydrocarbons can be employed, such as propane, cyclohexane, methylcyclohexane, n-pentane, n-hexane, isooctane, dodecane, and the like, or mixtures thereof, including primarily those paraffins and cycloparaffins having up to about 12 carbon atoms per molecule. Other diluents can be used provided the diluent is nonreactive under the conditions of the olefin reaction.

EXAMPLES

Particular reactants, species, reaction modes, reaction conditions or other parameters, are intended to be illustrative, and not limitative of the reasonable scope of my invention as disclosed in this specification including claims.

EXAMPLE I

A commercially available catalyst, $CoO/MoO_3$ on alumina (3.4 percent CoO, 11.0 percent $MoO_3$, 85.6 percent $Al_2O_3$), commonly termed cobalt molybdate on alumina, was treated with aqueous potassium hydroxide (1.5 percent by weight) and the excess base removed by water washing. The catalyst then was conventionally activated by heating in air at 1,000° F. for five hours. This catalyst (10 g portion) then was saturated with about 10 g of water at room temperature and placed in a closed vessel (110 ml capacity) and heated for two hours at 1,000° F. at pressure of about 1,000 psig. The steam-activated catalyst then was heated at 1,000° F. for three hours. This catalyst, hereafter designated Catalyst No. 1, was cooled and stored under a nitrogen atmosphere until ready for use.

Another portion of the same commercial cobalt molybdate on alumina catalyst which had been treated with base as above and water washed, was activated conventionally by heating in air at 1,000° F. for five hours. This catalyst, hereafter designated as Catalyst No. 2, was cooled and stored under a nitrogen atmosphere.

The catalysts Nos. 1 and 2 were prepared as described above and were employed for the disproportionation of 4-vinylcyclohexene to 1,2-bis(3-cyclohexene-1-yl)ethylene in the following manner. A reaction vessel equipped with heating means and temperature monitor was equipped with a vertical column containing the catalyst bed. To the upper end of the catalyst-containing column was attached a reflux condenser. The reaction vessel was charged with 30 ml 4-vinylcyclohexene and the catalyst container charged with 10 g of catalyst. The reaction vessel contents were heated to reflux so that 4-vinylcyclohexene (vapor and liquid) was passed over the catalyst. The temperature of the vessel contents was noted from time to time and the elapsed time required for the vessel contents to reach 347° F. was recorded in each of the two runs. From previous work this time period to reach 347° F. was that necessary to reach 50 percent conversion of the starting 4-vinylcyclohexene. Employing this observation as a measure of catalyst activity would mean that the less time required for the vessel contents to reach 347° F., the greater was the catalyst activity. The results thus obtained for the two catalysts employed are shown below.

|  | Catalyst | |
| --- | --- | --- |
|  | No. 1 | No. 2 |
|  | (Invention) | (Control) |
| Time for Vessel Contents to Reach 347° F. | 35 minutes | 50 minutes |

The above results show that the steam-activated catalyst was significantly more active than the conventionally activated catalyst for the disproportionation of 4-vinylcyclohexene.

EXAMPLE II

A commercial $MoO_3$ on $Al_2O_3$ catalyst 20 g which had been base treated with 1.5 percent aqueous KOH was employed in a continuous reaction system for the disproportionation of 4-vinylcyclohexene to 1,2-bis(3-cyclohexen-1-yl)ethylene. The composition of this catalyst was 12.6 percent $MoO_3$, 0.03 percent $Na_2O$, 0.026 percent Fe, 0.10 percent $SiO_2$, and 87.24 percent $Al_2O_3$. Three runs were made with this catalyst with regeneration after each run by heating in air at 1,000° F. for 7 to 10 hours. Following the third run and regeneration step the catalyst was cooled in place under $N_2$ to room temperature of about 25° C. The cool catalyst was soaked with distilled water, and catalyst temperature then brought to 1,000° F. for 0.5 hour while the pressure was not allowed to exceed 200 psig. After the steam treatment, the steam was vented from the catalyst chamber and the catalyst heated at 1,000° F. in air for 5 hours. The system was flushed with dry nitrogen and the catalyst allowed to cool under nitrogen.

The steam-activated catalyst then was employed in a continuous reaction system for 4-vinylcyclohexene disproportionation. The reaction zone was at 212° F. under 3 to 7 psig pressure and the feed rate was at 0.8 ml/min. A sample of the reaction zone effluent was analyzed by gas-liquid chromatography after 3 hours reaction under the conditions above. The analysis showed 57.4 weight percent 4-vinylcyclohexene and 42.6 weight percent of the desired product 1,2-bis(3-cyclohexen-1-yl)ethylene. On the other hand, a run with the same catalyst before the steam treatment but under otherwise similar conditions and sampled at 2.75 hours reaction time showed the reaction zone effluent to contain 72.8 weight percent 4-vinylcyclohexene and 26.6 percent 1,2-bis(3-cyclohexen-1-yl)ethylene and 0.6 weight percent of two other unidentified products. The above results show the steam treatment provided a significant increase in catalyst activity for the disproportionation of 4-vinylcyclohexene to 1,2-bis(3-cyclohexen-1-yl)ethylene.

The steam-activated catalyst used above was regenerated as described above and again employed under the same conditions for 4-vinylcyclohexene disproportionation. After 3 hours reaction, the reaction zone effluent was analyzed as above and showed 61.7 weight percent 4-vinylcyclohexene and 38.3 weight percent 1,2-bis(3-cyclohexen-1-yl)ethylene. This result demonstrates that the regenerated steam-activated catalyst still had significantly higher activity than the control catalyst described above.

EXAMPLE III

Another 4-vinylcyclohexene disproportionation run was conducted in the continuous system under conditions described in Example II with a fresh 20 g charge of the same commercial base-treated $MoO_3$ on $Al_2O_3$ catalyst that was employed in the control run of Example II. After 4 hours reaction the reaction zone effluent analyzed by gas-liquid chromatography showed 75.0 weight percent 4-vinylcyclohexene and 24.5 weight percent 1,2-bis(3-cyclohexen-1-yl)ethylene. At the completion of the run (7 to 8 hours), the catalyst was regenerated by heating in air at 1,000° F. for 7 to 10 hours.

Distilled water was then pumped through the reaction system for 0.5 hour while the catalyst zone was kept at 1,000° F. and at 160 to 180 psig pressure. The system was then drained of water and heating was continued at 1,000° F. for 5 to 7 hours. The steam-activated catalyst thus prepared was employed in a run under essentially the same conditions employed for the control run above. The reaction zone effluent was analyzed as above after 4 hours reaction and showed 64.3 weight percent 4-vinylcyclohexene and 34.6 weight percent 1,2-bis(3-cyclohexen-1-yl)ethylene.

The above results demonstrate that the steam-activated catalyst was again significantly more active than the control catalyst for 4-vinylcyclohexene disproportionation.

EXAMPLE IV

Another $MoO_3$ on $Al_2O_3$ catalyst of essentially the same composition as that employed in Examples II and III was employed in the continuous system under the conditions described above in Example II for disproportionation of 4-vinylcyclohexene. However, a different supply of feedstock was employed in this run. After 3 hours reaction, the effluent from the reaction zone was analyzed by gas-liquid chromatography as before. The results showed 86.5 weight percent 4-vinylcyclohexene and 12.3 weight percent 1,2-bis(3-cyclohexen-1-yl)ethylene for this control run. The catalyst was then regenerated by heating in air for 7 to 10 hours and then steam-activated by passing steam generated from 90 ml of distilled water over the catalyst in the reactor at 1,000° F. in a period of 45 minutes. The catalyst then was heated at 1,000° F. for 5–7 hours as in the previous steam treatment runs. This steam-activated catalyst was employed for disproportionation of 4-vinylcyclohexene under the same conditions used in the control run of this Example. After 3 hours reaction, the effluent from the reaction zone was analyzed as before and showed 84.1 weight percent 4-vinylcyclohexene and 14.3 weight percent 1,2-bis(3-cyclohexen-1-yl)ethylene. These results again demonstrate that the steam activation of disproportionation catalysts according to this invention provided an increase in catalyst activity for disproportionation.

Reasonable variations and modifications of the process of my invention are possible without departing from the scope and spirit of my disclosure as set forth in the specification hereinabove and the claims hereinafter.

I claim:

1. In the process of converting at least one reactant selected from the group consisting of cyclic and acyclic mono and polyene olefin hydrocarbons of at least 3 carbon atoms and mixtures of at least one such olefin hydrocarbon and ethylene according to the olefin reaction by contacting with a catalyst composition comprising molybdenum oxide or rhenium oxide on a silica, alumina, or silica- or alumina-containing support, optionally with a cobalt component when said catalyst composition is said molybdenum oxide on a support, under conditions suitable for obtaining a product of the olefin reaction which, as defined herein, can be visualized as the reaction between two first pairs of carbon atoms, carbon atoms of each first pair being connected by an olefinic double bond, to form two new pairs from the carbon atoms of said first pairs, two carbon atoms of said new pairs being connected by an olefinic double bond, within a conversion temperature range of about −60°F. to 1100°F. and a pressure in the range of about 0 to 2000 psig, the improvement which comprises the employment of a thermally activated catalyst composition prepared by the process of treating said catalyst composition under thermal activation conditions with water or water vapor at elevated temperatures of at least about 700°F and thereafter calcining said thermally treated catalyst composition.

2. The process of claim 1 wherein the olefin is an acyclic mono or polyene having from 3 to 30 carbon atoms per molecule, acyclic mono or polyene having 4 to 20 carbon atoms per molecule, mixtures of said olefins, or mixture of ethylene and at least one of said olefins.

3. The process according to claim 1 wherein said olefin is a cyclic olefin.

4. The process according to claim 3 wherein said cyclic olefin is 4-vinylcyclohexene and said catalyst comprises cobalt molybdate on alumina or molybdenum oxide on alumina.

5. In a process according to the olefin reaction, the steps comprising:

a. admixing at least one molybdenum or rhenium compound as the oxide thereof or compound convertible to the oxide on calcination in a molecular oxygen-containing atmosphere with a support, wherein said support is silica, alumina or silica- or alumina-containing support, and wherein when said molybdenum compound is employed, optionally further employing a cobalt compound which is the oxide or compound convertible thereto on calcination, b. thermally activating the catalyst composition from said step (a) in contact with water or water vapor at a temperature in the range of about 700° to 1300° F. for a time sufficient to substantially improve the activity of said catalyst composition in the olefin reaction, c. calcining said thermally activated catalyst composition from said step (b) in contact with a molecular oxygen-containing gas, d. contacting the calcined thermally activated catalyst composition with an olefin under olefin reaction conditions, wherein said olefin reaction as defined herein can be visualized as the reaction between two first pairs of carbon atoms, carbon atoms of each first pair being connected by an olefinic double bond, to form two new pairs from the carbon atoms of said first pairs, two carbon atoms of said new pairs being connected by an olefinic double bond, wherein said olefin is 1. an acyclic mono or polyene having at least 3 carbon atoms,
2. an acyclic mono or polyene having at least 3 carbon atoms, and a different acyclic mono or polyene having at least 3 carbon atoms,
3. ethylene and internal acyclic mono or polyene having at least 4 carbon atoms,
4. ethylene and acyclic mono or polyene having 3 or more carbon atoms, and a cyclic mono or cyclic polyene,
5. at least one cyclic mono or cyclic polyene,
6. an acyclic polyene having at least 7 carbon atoms and having at least 5 carbon atoms between any two double bonds, or
7. at least one acyclic polyene having at least 3 carbon atoms between any two double bonds.

6. The process according to claim 5 wherein after said contacting of said olefin for a time sufficient to reduce the activity of said calcined thermally activated catalyst composition, the further step of regenerating said catalyst composition by reheating in the presence of molecular oxygen-containing gas at calcination temperatures.

7. The process according to claim 5 wherein said supported molybdenum oxide or rhenium oxide catalyst composition contains about 0.5 to 30 weight percent of said molybdenum oxide or rhenium oxide based on the total catalyst composition, said molybdenum or rhenium calculated as the most stable oxide thereof.

8. The process according to claim 7 wherein said catalyst composition is said supported molybdenum catalyst and further contains said cobalt component in the range of up to 20 weight percent expressed as cobalt oxide.

9. The process according to claim 7 wherein said olefin is a cyclic olefin, and said catalyst composition comprises molybdenum oxide on a support.

10. The process according to claim 9 wherein said cyclic olefin is 4-vinylcyclohexene, and said catalyst comprises base-treated molybdenum on alumina or cobalt molybdate on alumina.

11. In a process according to the olefin reaction, the steps comprising:

a. admixing a rhenium compound which is the oxide or compound convertible to the oxide on calcination in a molecular oxygen-containing atmosphere with a support, wherein said support is silica, alumina or silica- or alumina-containing support, b. thermally activating the catalyst composition from said step (a) in contact with water or water vapor at a temperature in the range of about 700° to 1300° F. for a time sufficient to substantially improve the activity of said catalyst composition in the olefin reaction,
c. calcining said thermally activated catalyst composition from said step (b) in contact with a molecular oxygen-containing gas,
d. contacting the calcined thermally activated catalyst composition with an olefin under olefin reaction conditions, wherein said olefin reaction as defined herein can be visualized as the reaction between two first pairs of carbon atoms, carbon atoms of each first pair being connected by an olefinic double bond, to form two new pairs from the carbon atoms of said first pairs, two carbon atoms of said new pairs being connected by an olefinic double bond, wherein said olefin is 1. an acyclic mono or polyene having at least 3 carbon atoms,
2. an acyclic mono or polyene having at least 3 carbon atoms, and a different acyclic mono or polyene having at least 3 carbon atoms,
3. ethylene and internal acyclic mono or polyene having at least 4 carbon atoms,
4. ethylene and acyclic mono or polyene having 3 or more carbon atoms, and a cyclic mono or cyclic polyene,
5. at least one cyclic mono or cyclic polyene,
6. an acyclic polyene having at least 7 carbon atoms and having at least 5 carbon atoms between any two double bonds, or
7. at least one acyclic polyene having at least 3 carbon atoms between any two double bonds.

* * * * *